April 22, 1969 M. A. PIROTSKY 3,439,632
MULTIFLOW DOUGH-FORMING MACHINE FOR FANCY BAKED GOODS
Filed April 14, 1965 Sheet 1 of 5

Inventor
Motja Auselevich Pirotsky
By Attorneys

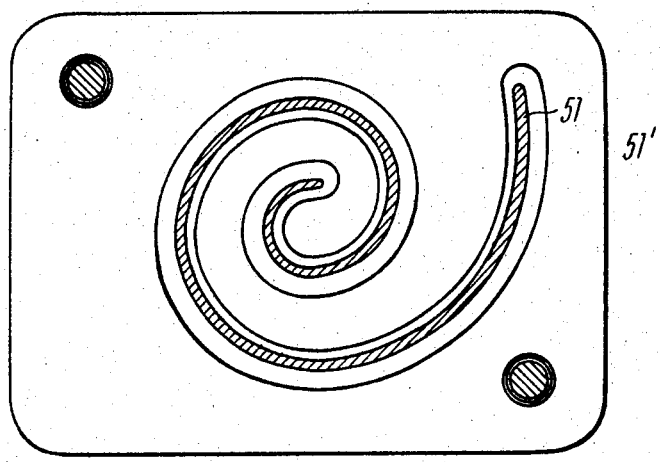
FIG. 6
FIG. 7
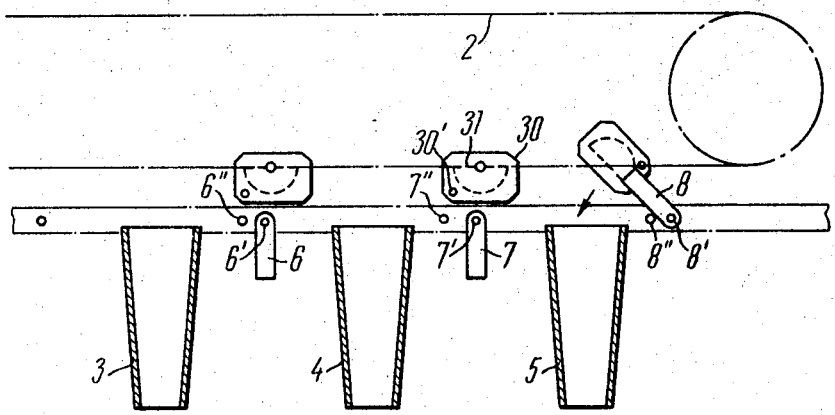

United States Patent Office 3,439,632
Patented Apr. 22, 1969

3,439,632
MULTIFLOW DOUGH-FORMING MACHINE FOR FANCY BAKED GOODS
Motja Anselevich Pirotsky, Kiev, U.S.S.R., assignor to Ukrainsky Nauchno-Issledovatelsky i Konstruktorsky Institute prodovolstvennoga maschinostroenia, Kiev, U.S.S.R.
Filed Apr. 14, 1965, Ser. No. 448,003
Int. Cl. A23g 3/00; A21c 5/00, 9/00
U.S. Cl. 107—1                              9 Claims

ABSTRACT OF THE DISCLOSURE

A multiflow dough-forming machine for fancy baked goods having a dough blanks feeder; a conveyor for receiving said blanks and for proofing them; dough-sheeting arrangements mounted beneath said conveyor for selectively receiving the blanks from said conveyor and for sheeting same; conveyors for transferring the sheeted blanks beneath butter batchmeters mounted thereabove for depositing butter thereon as the blanks are advanced from any selected dough-sheeting arrangement; a further batchmeter for depositing filling onto the buttered blanks mounted after one of said butter batchmeters; an attachment to roll up the buttered blanks mounted after the other butter batchmeter; further devices for notching the blanks to impart fancy shapes thereto; an arrangement for folding in and doubling the buttered and coated and filled blanks, said arrangement positioned at the discharge end of one of said second-mentioned conveyors transferring the sheeted blanks beneath a filling batchmeter; a batchmeter for sprinkling the fancy shaped blanks with some granular product; and an arrangement for wetting the blanks before they are sprinkled and a conveyor positioned beneath the discharge end of the last-mentioned conveyor and intended to support the sheets on which the notched blanks are laid down.

---

The present invention relates to food machinery and, more particularly, it relates to a dough-forming machine for fancy baked goods.

Various dough-forming machines are known at present intended for fancy baked goods and comprising an attachment to feed dough blanks; a chain conveyor with trays to receive said blanks and proof them and having at least one horizontal run; a dough-sheeting arrangement positioned beneath said horizontal run of said chain conveyor; belt conveyors to transfer the sheeted blanks in addition to a batchmeter mounted thereabove and intended to fill said blanks; an attachment to roll up the sheeted blanks in rolls; a rolls notching device; an arrangement for folding in and doubling of sheeted blanks and a conveyor to draw aside the sheets with the blanks.

However the existing dough-forming machines used heretofore have been deficient in that no variety of formed fancy baked goods has been obtained.

Therefore, it is an object of the present invention to provide for a variety of the blanks to be formed.

In the accomplishment of the above object according to the invention the dough-forming machine comprises an attachment to form fancy blanks for buns; a second arrangement for dough-sheeting; a butter batchmeter; another batchmeter for sprinkling and an arrangement for wetting the dough blanks with water before they are sprinkled.

The attachment to form blanks for the buns comprises preshaped blades fixed to a plate.

The batchmeter used for sprinkling the dough with, for instance, poppy-seeds comprises a tank with several metering devices each of said devices comprising a housing and a shaft with discs thereon, said shaft being accommodated inside the housing and accomplishing an arcwise oscillatory motion, grills for scattering poppy-seeds being fixed under said discs.

One butter batchmeter is provided with a blocking device which will actuate and prevent the feeding of butter when there is no blank under the batchmeter.

The other butter batchmeter is provided with needle valves and a mechanism with freely rotating rollers the latter serving to open the valves every time when the blanks approach and coact with rollers.

The arrangement for wetting the dough blanks before sprinkling comprises spray atomizers with needle valves.

Figure 2:
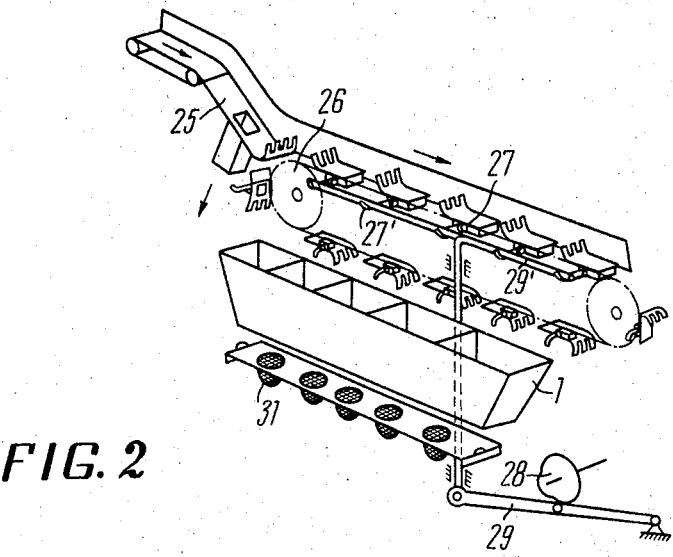
Figure 1:
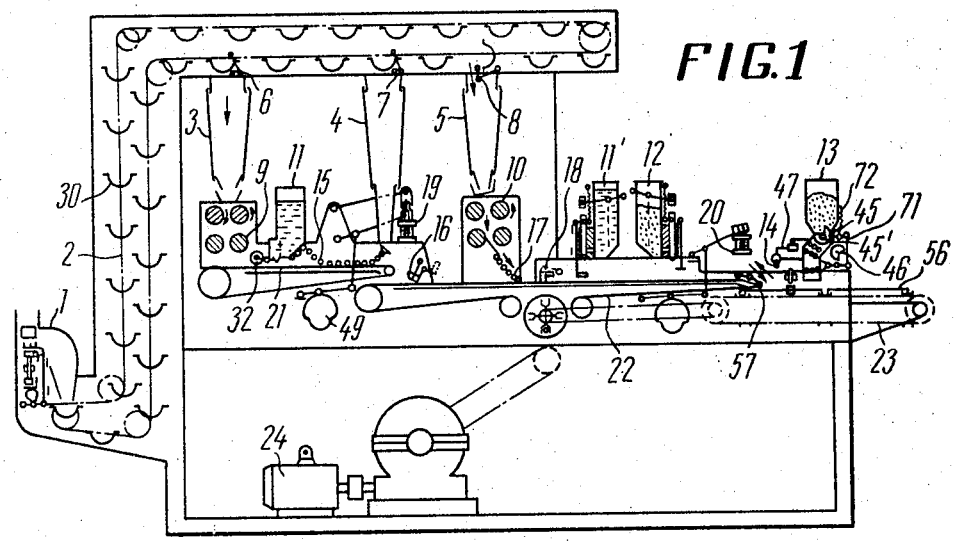
Figure 3:
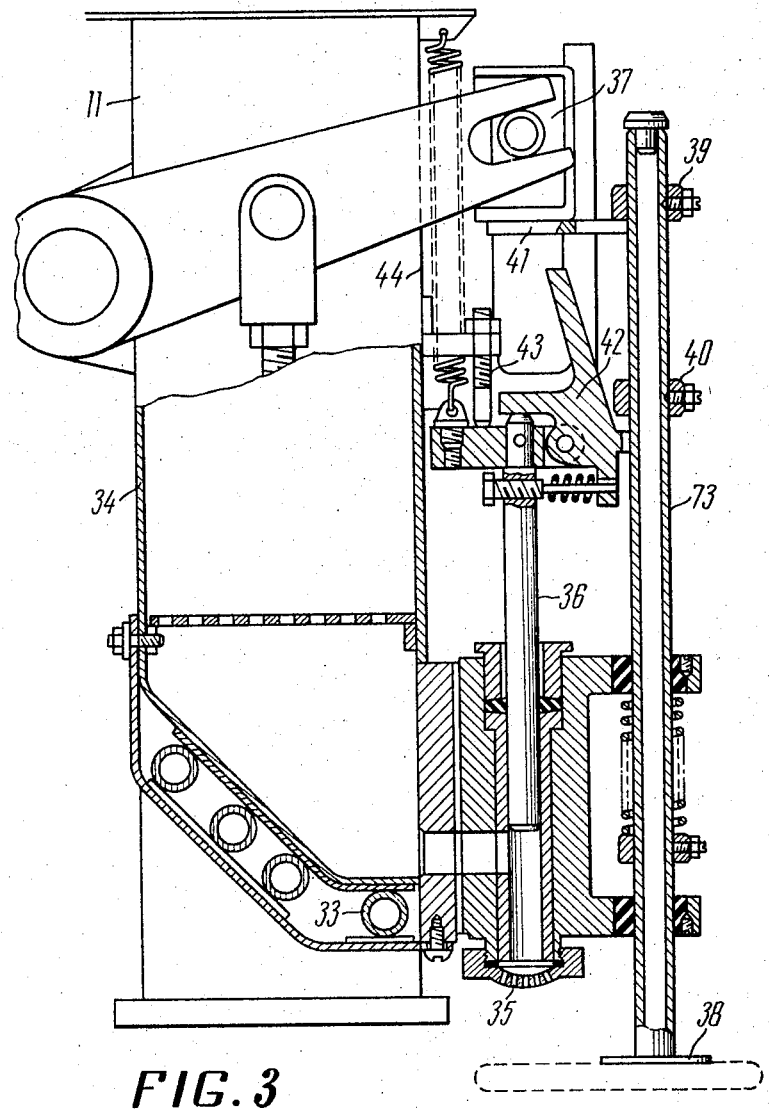
Figure 4:
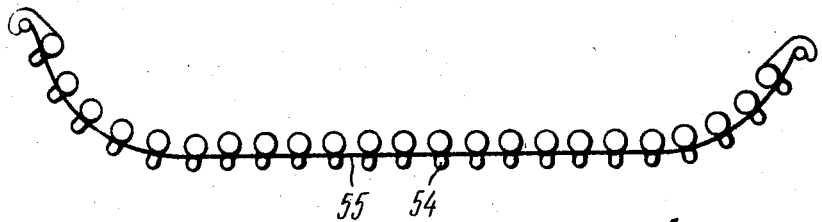
Figure 5:
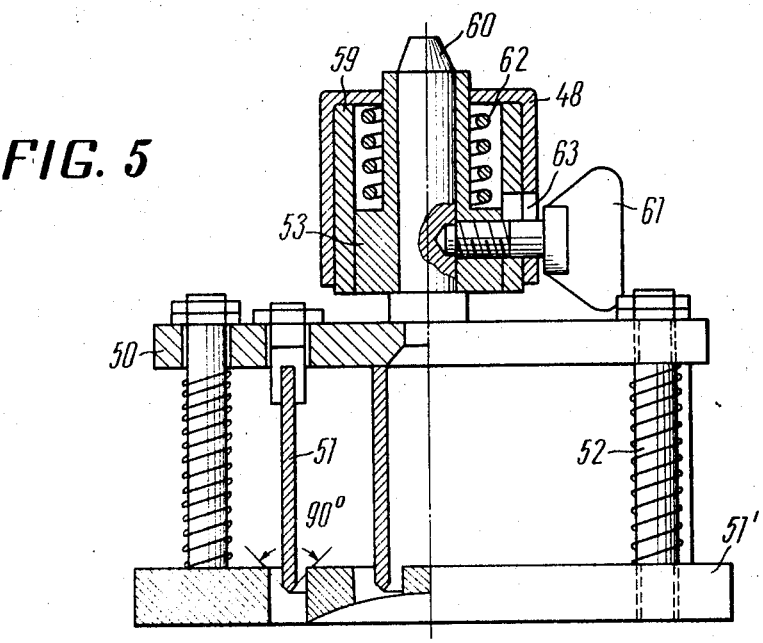
Figure 8:
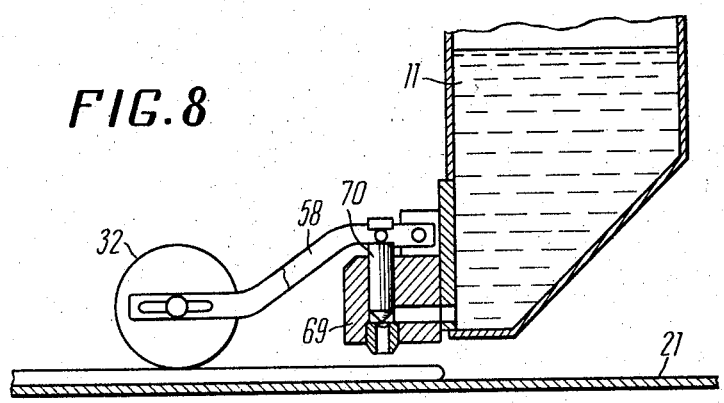
Figure 9:
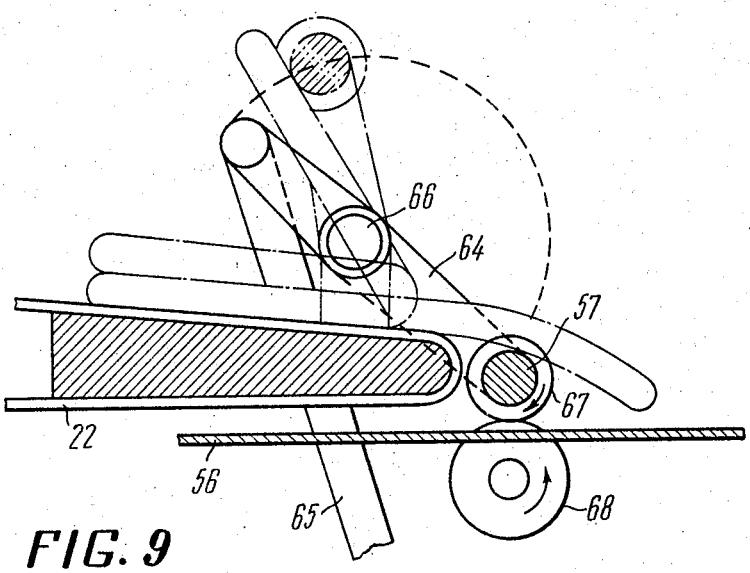

Other objects and advantages of the invention will become apparent upon reading the following description of the invention which is taken in conjunction with the accompanying drawings in which:

FIG. 1 is schematic view of the multiflow dough-forming machine for fancy baked goods;
FIG. 2 illustrates the dough blanks feeder;
FIG. 3 illustrates a butter batchmeter with a blocking mechanism;
FIG. 4 shows the grill for rolling up the dough in rolls;
FIG. 5 illustrates the notching device with blades intended for the blank;
FIG. 6 is a horizontal sectional view of the notching device for imparting a snail shape to the blanks for small;
FIG. 7 is a schematic side view of the part of the proofing conveyor with means to discharge the blanks from the trays into the chutes;
FIG. 8 is a side view of the butter batchmeter with a needle valve;
FIG. 9 is a side view of the arrangement for folding in and doubling the buttered and coated with filling sheeted blanks.

The machine (FIG. 1) comprises a dough blanks feeder said feeder being equipped with chutes 1, chain conveyor 2 for proofing dough blanks, dough chutes 3, 4 and 5 with fulcrumed stops 6, 7 and 8 thereabove; two dough-sheeting arrangements 9 and 10, two butter batchmeters 11 and 11' both provided with tanks; a batchmeter for filling material provided with tank 12; a batchmeter 13 for sprinkling with, for example, poppy-seeds, said batchmeter having one tank and several portioning devices; an arrangement for wetting the dough blanks said arrangement being provided with spray atomizer 14; barred grill 15 to roll up the blanks to form rolls, an arrangement 16 to center dough blanks delivered by conveyor 21 or chute 4 onto conveyor 22, roller bed 17; arrangement 18 to center the sheeted blanks delivered by roller bed 17 onto conveyor 22; two notching devices 19 and 20 to form fancy blanks; belt conveyors 21 and 22 to transfer dough blanks; and conveyor 23 to transfer the formed blanks.

Besides, in said arrangement is envisaged the power driven installation with electric motor 24.

The dough blanks feeder comprises inclined guide 25 (FIG. 2) with a comb at the outlet; transfer conveyor 26 with pivotally mounted L-shaped carriers 27 having combs and lateral projections 27', chutes 1 and a mechanism with cam 28, lever 29 and rod 29'. The cam 28 coacting with the lever 29, the rod 29' lowers and interacts with lateral projections 27', causing the turn of the carriers in a plane perpendicular to the direction in which the conveyor 26 proceeds, so that blanks fall from the carriers 27 into the chutes 1.

As is shown in FIGS. 1, 2 and 7 chain conveyor 2 is provided with trays 30 pivotally suspended to the chain. Every tray 30 has pockets 31 whose number is in a strict accordance with that of installation rows.

As is shown in FIG. 7, every tray 30 has on its lateral side a roller 30'. The fulcrumed stops 6, 7 and 8 are of the same design and are designed as levers, pivotally mounted on studs 6', 7', 8', respectively. Each of these levers may be swung up into the working position in which they rest on stop lugs 6", 7", 8" respectively, mounted on the frame of the proofing conveyor (as the lever 8, for instance), or may retain its original position (as the levers 6 and 7, for instance). The lever being swung up into the working position, the roller 30' of each tray 30 transported by chain conveyor coacts with such lever, the tray 30 is tilted over the respective dough chute 3, 4 or 5, and returns in its original position after passing the lever. Retaining its original position, the lever permits traveling of the tray without tilting.

Dough-sheeting arrangements 9 and 10 are made as two pairs of horizontal shafts placed one above the other. The batchmeter 11 intended to butter ordinary buns is provided with a tank having a preheater. Its metering device comprises five needles valves 69 (FIG. 8). The needle 70 of every valve is linked with the lever 58, one end of which is pivotally mounted on the body of the batchmeter 11 and the other one carries a freely rotating roller 32. When the roller 32 coacts with a blank, carried by a belt conveyor 21, it rotates and raises the needle 70 which opens the outlet orifice of the valve 69. The dimensions of the valve outlet orifice are designed so that in the time which butter takes to pass the orifice and to reach the surface of the blank, the blank passes the distance between roller 32 and orifice and reaches a position in which its front end is beyond the orifice by 20–30 mm.

The batchmeter 11' intended to deliver butter to the dough blanks for filled buns advanced from the sheeting arrangement 10 upon conveyor 22 is a tank provided with steam preheaters 33 (FIG. 3), housing 34, pumps with spray atomizers 35, pistons 36 and a blocking device. Pistons 36 are actuated by a cam mechanism through crosspiece 37. The blocking device consists of spring-loaded rod 73 with a plate 38 mounted on its lower end, thrust rings 39 and 40 mounted onto the rod, strip 41 located on crosspiece 37, detent 42, rest 43 and spring 44. The batchmeter 12 intended to deliver filling onto the dough blanks for filled buns is of the same design and is also provided with a similar blocking device.

Due to such a performance of the arrangement piston 36 supplies butter or filling only when the dough blank is under spray atomizer 35. Otherwise, if crosspiece 37 is lowered, clearance gauge 38 will become pressed against the conveyor because strip 41 becomes disengaged from ring 39. Thereafter, thrust ring 40 interacts with detent 42, turns it and, as a result, the crosspiece makes a free play (without actuating upon the piston) and neither butter nor filling come from the batchmeters 11' and 12.

With the dough blank on the conveyor, plate 38 rests thereagainst, ring 40 moves up and does not interact with detent 42, while crosspiece 37 makes piston 36 move downwards, thus portioning either butter or filling. With the crosspiece, somewhat elevated, the piston displaces upwards until it rests against stop 43 and, meantime, the plate elevates being actuated by strip 41.

For finishing the fancy blanks for the small with some granular products, for instance, poppy-seeds a batchmeter 13 is used with tank and several metering devices provided beneath said tank. Each of said metering devices comprises a housing and the disk 45 with the pocket 45' accommodated thereinside said pocket ensuring dosing of poppy-seeds for sprinkling. Disks 45 of all metering devices are fitted onto a common shaft which makes an arcwise oscillatory motion (angle of turn being 30°) by means of cam 46, lever mechanism 71 connected to the shaft carrying discs and actuated by the cam 46 and a spring 72 which constantly presses the lower level of the lever mechanism 71 to the cam 46. To the lower part of housing of each metering device a chute is secured, said chute being provided with grills for distributing granular products evenly over the whole cross-section of the chute.

When the disk with the granular product in the pocket abruptly turns, the granular product is thrown out from its pocket onto the grills and is evenly distributed over the cross-section of the chute and then covers the surface of the blank for the fancy roll. An arrangement with spray atomizers 14 for wetting the blanks before they are sprinkled is attached to the tank of batchmeter 13. The spray atomizers 14 are actuated by means of cam 46, and lever mechanism 71 and every time when the blanks come to a stop. The needle of valve 47 is connected with upper lever mechanism 71.

The notching devices 19 and 20 (FIG. 1) are intended to impart a fancy shape to dough blanks and are of the same design. The notching device 19 is intended to impart a fancy shape to the rolled-up blanks for oridnary buns, emerging from beneath grill 15 or to the blanks for the small delivered by the chute 4. (Here and further on the word "small" means the goods, formed from the proofed dough blanks without sheeting and rolling up but only by notching, said goods having a fancy shape such as Kaiser rolls, pretzels, snails and so on.) The notching device 20 is intended to impart fancy shapes to the blanks for filled buns emerging from beneath batchmeter 12. Each of the devices 19 and 20 has the bar 48 to which are secured detachable arrangements with notching blades. The bar 48 is connected to the lever mechanism, for example, to the four-link mechanism (as bar 48 of notching device 19, FIG. 1). Said lever mechanism is driven by cam mechanism 49 and reciprocates the bar 48 in a vertical direction.

All of the arrangements with notching blades (FIG. 5) have a plate 50, to which the shaped blades 51 are fixedly secured. To the plate 50 is also secured spring-loaded kicker 51' provided with guide fingers 52 passing through the apertures in the plates. The kicker has a shaped slot for blade 51 to pass therethrough.

The number of the arrangements of notching blades secured to every bar 48 corresponds with that of the blanks in rows, passing through the forming machine.

Each of the bars 48 is provided with fixedly secured thimbles 59 with sliding hubs 53 inside thereof, said hubs serving for installation of arrangements with notching blades. The plate 50 of the arrangement has a tail-piece 60 which is inserted in the hub and fixed therein by means of a screw 61 passing through the lateral threaded aperture in the wall of the hub.

The hub 53 is spring-loaded in the thimble 59 by the helical spring 62, while the bar 48 and thimble 59 have a lateral slot 63 allowing the vertical displacements of the screw 61 together with the hub 53. In FIG. 6 is shown in plan one of the notching blades designed to impart a snail shape to the blanks for small. It must be clear that the blades and the slots therefor in the kickers may be of any required shape. As is shown in FIG. 5, the notching edges of the blades, which are used to form small, are sharpened to 90°, a blade having such a shape of the notching edge primarily forming the blank and then, only reaching its lowest position notches the flattened blank.

The blades intended to form the rolled-up blanks for ordinary buns have sharp notching edges. A blade of such a shape cuts the layers of the rolled-up blank without bringing the cut edges of the layers to an adhering condition.

However, the blades of mechanism 20 to form blanks for filled buns are made so that the layers at the places of notching stick together and prevent going out of filling. The centering arrangement 16 intended to center the blanks under the notching device 19 comprises a plank disposed across belt conveyor 22 and mounted on turnable levers.

The centering arrangement 18 intended to center the sheeted blanks comprises a plank which stops said blanks, coming from the roller bed 17 onto conveyor 22. This plank is also disposed across belt conveyor 22 and mounted on turnable levers. The plank arranges the blanks on the conveyor 22 so that after the subsequent moving cycles of the latter they occupy their position subsequently under the butter batchmeter 11′, under the filling batchmeter 12 and under the notching device 20.

Conveyor 22 has an intermittent motion, during the stops of which operate the centering arrangements 16 and 18, batchmeters 11′ and 12, the notching devices 19 and 20, all of these being positioned over the conveyor 22. During the moving cycles of the conveyor 22 the planks of the arrangements 16 and 18, raised by the turnable levers, allow the blanks to pass.

The device to fold in and to double before notching the sheeted blanks coated with filling is positioned at the discharge end of the conveyor 22. Said device comprises roller 57 (FIGS. 1 and 9), which receives from the conveyor 22 the ends of the dough blanks. The roller 57 is rotatably mounted to the ends of levers 64. The other end of one of said levers is connected with the cam for operating notching device 20 by means of the rod 65 and lever (not shown) resting upon the cam. During the stop of intermittent motion of conveyor 22 the cam turns by means of the lever and rod 65 the levers 64 around their studs 66 in the direction denoted by the arrow and the roller 57 folds in and doubles the filling coated blanks under the notching device 20. The roller 57 has a friction disc 67. When the roller 57 is in its lower position, the disc 67 rests upon the driving roller 68 intended to rotate the roller 57. Conveyor 23 is intended to feed the sheets 56 delivered by conveyor 22 on the sheets over the notched blanks, which are laid down on the sheets by means of roller 57. The conveyor 23 also has intermittent motion, the stops of which coincide with moving cycles of conveyor 22. The sheets 56 with notched blanks are then transported by conveyor 23 to the batchmeter 13 for sprinkling.

The grill for rolling up comprises bars 54 (FIG. 4) attached to flexible band 55.

The mode of action of the machine in accordance with the present invention is as follows. The rounded dough blanks enter the feeder and then, through chutes 1 in several rows (the number of said rows is in a strict accordance with the machine requirements, they are loaded in the pockets 31 of trays 30 of conveyor 2 for proofing. Thereafter through special dough chutes (either 3 or 4 or 5—depending upon the type of goods to be formed) they are delivered to the corresponding dough-sheeting or notching arrangement.

Forming of blanks for ordinary sweet dough takes place in the following way. The stop 6 is swung up into the working position and the stops 7 and 8 remain in their original positions. From conveyor 2, the blanks dropping through dough chute 3 enter dough-sheeting arrangement 9 and after sheeting they are carried by belt conveyor 21 under the butter batchmeter 11, being buttered by the latter. Thereafter, they are rolled up beneath the grill 15 and fall onto conveyor 22 during the stops of intermittent motion of the latter, and are stopped by the plank of centering arrangement 16, taking place accurately under the notching device 19. Thereafter the lever mechanism driven by cam mechanism 49 lowers the bar 48, carrying arrangements with notching blades. When the kickers 51′, going down with the bar 48, reach the upper surfaces of the rolled-up blanks, they stop but the plates 50 with the notching blades 51 continue to move compressing the springs 52 of said kickers until the blades, which have notched the blanks, reach the belt of conveyor 22. Then the bar 48 begins to rise, but the kickers 51′, actuated by springs, retain the blanks until the blades emerge from them, and then the notching device 19 rises to its initial position.

Thereafter the levers with the plank of the centering arrangement 16 turn, the plank rises in such a manner that the notched blanks for ordinary buns during the subsequent motion of the belt conveyor 22 can pass under the plank. Then the centering arrangement 16 returns in its initial position.

The notched blanks are transported by intermittently moving conveyor 22 to its discharge end and then are delivered by said conveyor over the roller 57 on the sheets 56, supplied by intermittently moving conveyor 23.

When forming the small the stop 7 is swung into the working position and the stops 6 and 8 retain their original positions. In this case, the dough blanks from the tray 30 tilted by stop 7 drop through the chute 4 into the belt conveyor 22 where they are centered by arrangement 16, notched by the device 19 and transferred onto the sheet 56 as it has been described hereinbefore.

Further on, the sheet 56 with notched blanks for the small is transported by intermittently moving conveyor 23 under the wetting device and then under the sprinkling batchmeter 13, where the blanks are sprayed with water from spray atomizers 14 and sprinkled with poppy-seeds.

When forming filled buns the blanks dropping through the dough chute 5 enter dough-sheeting arrangement 10 and then, through roller bed 17 they fall onto conveyor 22 and rest against plank of centering arrangement 18. Thereafter the plank of arrangement 18 rises, the blanks are transported by conveyor 22 subsequently in position under the batchmeter 11′, where they are buttered and under the batchmeter 12, depositing the filling onto the sheeted and buttered blanks. From the batchmeter 12 the blanks are transported to the discharging end of conveyor 22 so that during the stop of the latter the front ends of the blanks are being laid onto the roller 57. When the levers 64 turn in the direction of the arrow (FIG. 9) the roller 57 raises the front ends of the blanks, folds the latter and doubles it so that the doubled blanks take their place under the notching device 20. Then the roller 57 returns to the initial position. The sheeted blanks being doubled, the device 20 notches them as has been described for the notching device 19. The conveyor 22 then delivers the notched blanks over the roller 57 on the sheet 56.

Though the present invention is described in accordance with its preferred embodiment, it is apparent, that various modifications may be effected by those skilled in the art without, however, departing from the principle and scope of the invention. These modifications are considered as falling within the essential nature and the scope of the invention as described hereinabove and in the appended claims.

I claim:

1. A multiflow dough-forming machine for fancy baked goods comprising a dough blanks feeder; a conveyor to receiver said blanks and proof them; dough-sheeting arrangements mounted beneath said conveyor for selectively discharging the blanks from the conveyor into a selected dough-sheeter arrangement for sheeting the same; conveyors disposed one after another to transfer the sheeted blanks beneath butter batchmeters mounted thereabove for deposit of butter thereon as they are advanced from any selected dough-sheeting arrangement; a batchmeter to deposit filling upon buttered blanks as they are advanced on one of the last named blanks transferring conveyors from their respective selected sheeting arrangement, said filling batchmeter being provided after one of said butter batchmeters; an attachment to roll up the sheeted blanks in rolls, said attachment being positioned after the other butter batchmeter; devices to notch the blanks for imparting fancy shape thereto; an arrangement to fold in and double the buttered and coated with filling sheeted blanks, said last named arrangement being positioned at the discharge end of the last named conveyors transferring the sheeted blanks beneath the filling batchmeter; a batchmeter for sprinkling the fancy shaped blanks with some granular product; an arrangement for wetting fancy shaped blanks before they are sprinkled and a conveyor positioned to pass beneath the discharge end of one of said second mentioned blanks transferring conveyors and intended to support the sheets on which the notched blanks are laid down.

2. A multiflow dough-forming machine for fancy baked goods comprising a dough blanks feeder; a chain conveyor with trays to receive said blanks and proof them; dough-sheeting arrangements mounted beneath said conveyor for selectively discharging the blanks from the conveyor into a selected dough-sheeting arrangement for sheeting the same; conveyors disposed one after another to transfer the sheeted blanks beneath a butter batchmeter provided thereabove, for deposit of butter thereon as they are advanced from any selected dough-sheeting arrangement; a batchmeter to deposit filling upon buttered blanks as they are advanced on one of the last named blanks transferring conveyors from their respective selected sheeting arrangement, said filling batchmeter provided after one of said butter batchmeters; an attachment to roll up the sheeted blanks in rolls, said attachment being positioned after the other butter batchmeter; devices to notch the blanks for imparting fancy shape thereto; an arrangement to fold in and double the buttered and coated with filling sheeted blanks, said last named arrangement positioned at the discharge end of the last named conveyors transferring the sheeted blanks beneath said filling batchmeter; a batchmeter for sprinkling the fancy shaped blanks with some granular product; an arrangement for wetting fancy shaped blanks before they are sprinkled and an intermittently moving conveyor positioned to pass beneath the discharge end of one of the second named blanks transferring conveyors and intended to support the sheets on which the notched blanks are laid down.

3. A multiflow dough-forming machine for fancy baked goods comprising a dough blanks feeder, a chain conveyor with trays to receive said blanks and proof them; dough-sheeting arrangements mounted beneath said conveyor for selectively discharging the blanks from the conveyor into a selected dough-sheeting arrangement for sheeting same; conveyors disposed one after another to transfer the sheeted blanks beneath butter batchmeters provided thereabove, one of said batchmeters being provided with a blocking device to render that batchmeter inoperative when there are no blanks beneath it, said batchmeter with said blocking device comprising a spring loaded rod with a plate mounted at the end of said rod, thrust rings mounted onto said rod, a batchmeter piston, a detent attached to said piston and interacting with said rings, a cross-piece actuating the piston by means of said detent; a batchmeter to deposit filling upon buttered blanks as they are advanced on one of the last named blanks transferring conveyors from their respective selected sheeting arrangement, said filling batchmeter being provided after one of said butter batchmeters; an attachment to roll up the sheeted blanks in rolls, said attachment positioned after the other butter batchmeter; devices to notch the blanks for imparting fancy shape thereto; an arrangement to fold in and double the buttered and coated with filling sheeted blanks, said last named arrangement provided at the discharge end of the last named conveyors transferring the sheeted blanks beneath said filling batchmeter; a batchmeter for sprinkling the fancy shaped blanks with some granular product; an arrangement for wetting fancy shaped blanks before they are sprinkled and a conveyor positioned to pass beneath the discharge end of one of the second named blanks transferring conveyors and intended to support the sheets on which the notched blanks are laid down.

4. A multiflow dough-forming machine as in claim 3, wherein the other butter batchmeter is provided with needle valves and devices for opening said valves during the passage of the sheeted blanks through an area beneath said batchmeter; each of said valve opening devices comprising a lever and freely rotating roller mounted on the end of said lever; said lever being linked to said valve; said device actuated by engagement of said roller with each sheeted blank on one of said second-mentioned conveyors.

5. A multiflow dough-forming machine as in claim 3, wherein the dough blanks feeder comprises an inclined guide with a comb at the outlet, a transfer conveyor with pivotally mounted L-shaped carriers having combs, vertically placed chutes provided thereunder and cam and lever mechanism, said carriers being actuated by said cam and lever mechanism to discharge the blanks into said chutes.

6. A multiflow dough-forming machine as in claim 3, wherein each arrangement for rolling up the sheeted blanks is made in the shape of a grill provided with bars mounted to a flexible band.

7. A multiflow dough-forming machine as in claim 3, wherein the arrangement to fold in and double the buttered and coated with filling sheeted blanks comprises turnable levers, a roller rotatably mounted at the ends of said levers and a friction drive to impart rotation to said roller.

8. A multiflow dough-forming machine as in claim 3, wherein the devices to notch the blanks for imparting to them a fancy shape are provided with spring-loaded kickers.

9. A multiflow dough-forming machine for fancy baked goods comprising a dough blanks feeder; a chain conveyor with trays to receive said blanks and proof them; dough-sheeting arrangements mounted beneath said conveyor for selectively discharging the blanks from the conveyor into a selected dough-sheeting arrangement for sheeting the same; conveyors disposed one after another to transfer the sheeted blanks beneath butter batchmeters provided thereabove, one of said batchmeters being provided with a blocking device to render this batchmeter inoperative when there is no blank beneath it, said batchmeter with said blocking device comprising a spring loaded rod with a plate mounted at the lower end of said rod, thrust rings mounted onto said rod, a batchmeter piston, a detent attached to said piston and interacting with said rings, a cross-piece actuating the piston by means of said detent, the other batchmeter being provided with needle valves and devices for opening said valves during the passage of these sheeted blanks through an area beneath said batchmeter, each of said devices comprising a lever and a freely rotating roller mounted at the end of said lever, said lever linked to said valve, said device actuated by engagement of said roller with each sheeted blank on one of said second-mentioned blanks transferring convyors; a batchmeter to deposit filling upon buttered blanks as they are advanced on one of the second-mentioned blanks transferring conveyors from their respective selected dough-sheeting arrangement, said filling batchmeter provided after one of said butter batchmeters; an attachment to roll up the sheeted blanks in rolls, said attachment positioned after the other butter batchmeter; devices to notch the blanks for imparting fancy shape thereto; an arrangement to fold in and double the buttered and coated with filling blanks; said arrangement positioned at the discharge end of one said second mentioned conveyors transferring the buttered blanks beneath said filling batchmeter, a batchmeter for sprinkling the fancy shaped blanks with some granular product; an arrangement for wetting fancy shaped blanks before they are sprinkled and a conveyor positioned to pass beneath the discharge end of one of the second-mentioned blanks transferring conveyors and intended to support the sheets on which the notched blanks are laid down.

References Cited
UNITED STATES PATENTS

| | | | |
|---|---|---|---|
| 1,168,305 | 1/1916 | Hood | 107—1 |
| 2,450,033 | 9/1948 | Cohen | 107—4 |
| 2,750,899 | 6/1956 | Marasso | 107—4 |
| 3,167,032 | 1/1965 | Rhodes | 107—4 |

WALTER A. SCHEEL, *Primary Examiner.*

JOSEPH SHEA, *Assistant Examiner.*

U.S. Cl. X.R.

107—4, 9, 68